(12) United States Patent
Sawa et al.

(10) Patent No.: US 12,702,929 B2
(45) Date of Patent: Aug. 11, 2026

(54) PROGRAM, INFORMATION PROCESSING DEVICE, METHOD, AND SYSTEM

(71) Applicant: CYGAMES, INC., Tokyo (JP)

(72) Inventors: Shohei Sawa, Tokyo (JP); Masayoshi Sato, Tokyo (JP); Koji Otani, Tokyo (JP); Yasuaki Hayashizaki, Tokyo (JP); Ryota Yagi, Tokyo (JP); Junpei Yamaguchi, Tokyo (JP); Takafumi Oka, Tokyo (JP)

(73) Assignee: CYGAMES, INC., Tokyo (JP)

( * ) Notice: Subject to any disclaimer, the term of this patent is extended or adjusted under 35 U.S.C. 154(b) by 255 days.

(21) Appl. No.: 18/543,700

(22) Filed: Dec. 18, 2023

(65) Prior Publication Data

US 2024/0115959 A1 Apr. 11, 2024

Related U.S. Application Data

(63) Continuation of application No. PCT/JP2022/018705, filed on Apr. 25, 2022.

(30) Foreign Application Priority Data

Jun. 21, 2021 (JP) ................................ 2021-102545

(51) Int. Cl.
*A63F 13/795* (2014.01)
*A63F 13/35* (2014.01)
*A63F 13/537* (2014.01)

(52) U.S. Cl.
CPC ............ *A63F 13/795* (2014.09); *A63F 13/35* (2014.09); *A63F 13/537* (2014.09)

(58) Field of Classification Search
None
See application file for complete search history.

(56) References Cited

U.S. PATENT DOCUMENTS

2011/0294580 A1 12/2011 Nakamura et al.
2015/0283466 A1* 10/2015 Suga ..................... A63F 13/825 463/31

(Continued)

FOREIGN PATENT DOCUMENTS

JP 2011248698 A 12/2011
JP 5938451 B2 6/2016

OTHER PUBLICATIONS

Office Action issued in Japanese Application No. 2021-102545; Dated Jan. 4, 2022 (6 pages).

(Continued)

*Primary Examiner* — Ronald Laneau
(74) *Attorney, Agent, or Firm* — Osha Bergman Watanabe & Burton LLP

(57) ABSTRACT

Provided are a program, an information processing device, a method, and a system that allow properties of an organized party to be easily grasped.

An information processing device 10 is an information processing device for executing a game and includes: a setting unit 231 for setting two or more game media on a deck with which indicator information is associated; an indicator-information-point calculation unit 232 for determining points for each item of the indicator information on the basis of predetermined data associated with the game media; and an indicator-information determination unit 233 for determining the indicator information to be displayed on a game screen on the basis of the points for each item of the indicator information obtained by the indicator-information-point calculation unit 232 and associating the determined indicator information with the deck.

11 Claims, 9 Drawing Sheets

(56) References Cited

U.S. PATENT DOCUMENTS

| | | | | |
|---|---|---|---|---|
| 2016/0059130 | A1 * | 3/2016 | Shimoda | A63F 13/537<br>463/31 |
| 2018/0093193 | A1 * | 4/2018 | Tamura | A63F 13/44 |
| 2019/0270017 | A1 * | 9/2019 | Shimoda | A63F 13/67 |

OTHER PUBLICATIONS

International Search Report issued in International Application No. PCT/JP2022/018705, mailed Jul. 5, 2022 (5 pages).

Written Opinion issued in International Application No. PCT/JP2022/018705; Dated Jul. 5, 2022 (4 pages).

* cited by examiner

FIG.5

PROGRAM, INFORMATION PROCESSING DEVICE, METHOD, AND SYSTEM

TECHNICAL FIELD

The present invention relates to programs, etc., and particularly to a program, etc. for a game executed in an information processing device that accepts a player input.

BACKGROUND ART

In recent years, as information processing devices, such as smartphones, have rapidly become popular, a large number of games that are executed on such information processing devices have been released. Among these types of games, there are well-known games in which a main character and a sub-character are selected, and an ability of the main character is enhanced by combining the sub-character with the main character. For example, in a well-known game in which a battle against an enemy character is executed, the abilities of a main character are enhanced by adding the abilities, such as attacking power and recovery power, of a sub-character to the abilities, such as attacking power and recovery power, of the main character (e.g., refer to PTL 1). In addition, in this type of game, it is also well known that a party is organized with a plurality of characters so that the party can be used for the games.

CITATION LIST

Patent Literature

[PTL 1]
Publication of Japanese Patent No. 5938451

SUMMARY OF INVENTION

Technical Problem

An organized party may have properties based on the properties of, for example, game media, such as characters, that are constituent components of the organized party. In such a case, a player can grasp the properties of a party by organizing the party after grasping the properties of the game media. In addition, the player can assign marks, such as tags, indicating the grasped properties of the party to the party.

However, with such a method, when the number of game media that can constitute a party increases or the number of organized parties increases, it is sometimes difficult for the player to grasp the properties of each party. Such a problem applies to games in which a party is organized, regardless of the type of the game. Note that a party can be referred to as a team or a group.

The present invention has been conceived to solve such a problem, and an object thereof is to provide a program, an information processing device, a method, and a system that allow the properties of an organized party to be easily grasped.

Solution to Problem

A program as an aspect of the present invention is a program for a game executed by an information processing device and is characterized by causing the information processing device to function as: a setting means for setting two or more game media on a deck with which indicator information is associated; an indicator-information-point calculation means for determining points for each item of the indicator information on the basis of predetermined data associated with the game media; and an indicator-information determination means for determining the indicator information to be displayed on a game screen on the basis of the points for each item of the indicator information obtained by the indicator-information-point calculation means and associating the determined indicator information with the deck.

An information processing device as an aspect of the present invention is an information processing device for executing a game and is characterized by including: a setting means for setting two or more game media on a deck with which indicator information is associated; an indicator-information-point calculation means for determining points for each item of the indicator information on the basis of predetermined data associated with the game media; and an indicator-information determination means for determining the indicator information to be displayed on a game screen on the basis of the points for each item of the indicator information obtained by the point calculation means and associating the determined indicator information with the deck.

A method as an aspect of the present invention is a method for a game executed by an information processing device and is characterized by including: a setting step for setting two or more game media on a deck with which indicator information is associated; an indicator-information-point-calculation step for determining points for each item of the indicator information on the basis of predetermined data associated with the game media; and an indicator-information determination step for determining the indicator information to be displayed on a game screen on the basis of the points for each item of the indicator information obtained in the indicator-information-point calculation step and associating the determined indicator information with the deck.

A system as an aspect of the present invention is a system for a game and is characterized by having: an electronic device; and a server connected to the electronic device via a network, wherein the electronic device or the server functions as a setting means for setting two or more game media on a deck with which indicator information is associated, the electronic device or the server functions as an indicator-information-point calculation means for determining points for each item of the indicator information on the basis of predetermined data associated with the game media, and the electronic device or the server functions as an indicator-information determination means for determining the indicator information to be displayed on a game screen on the basis of the points for each item of the indicator information obtained by the indicator-information-point calculation means and associating the determined indicator information with the deck.

Advantageous Effects of Invention

According to the present invention, it is possible to easily grasp the properties possessed by an organized party.

BRIEF DESCRIPTION OF DRAWINGS

FIG. 5 is an example of a functional block diagram of a game control unit.

DESCRIPTION OF EMBODIMENTS

A game system according to an embodiment of the present invention will now be described with reference to the drawings. In this description, there are cases where descriptions that are more detailed than necessary are omitted for convenience of explanation. For example, there are cases where detailed descriptions of matters that are already well known and repeated descriptions of substantially the same configurations are omitted.

This game system can be realized by a system having a plurality of information processing devices connected via a network, but can also be realized by a single information processing device. First, an embodiment realized by a single information processing device is described, and then a system connected to a network is described.

Embodiment Realized by Information Processing Device

Configuration

Figure 1:
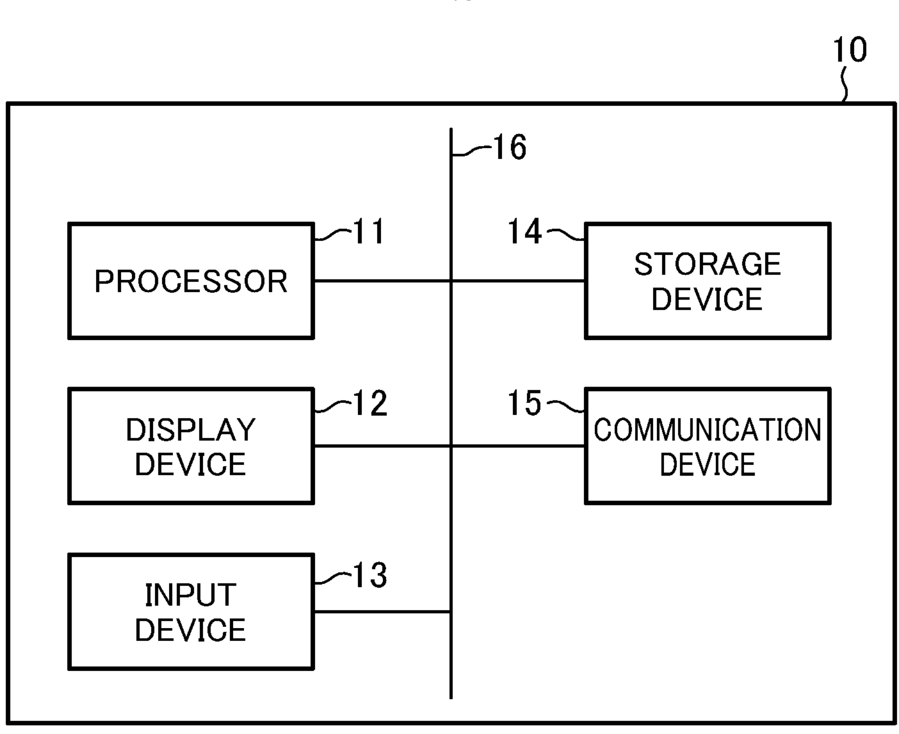
FIG. 1 is a block diagram showing the hardware configuration of an information processing device according to an embodiment of the present invention.

FIG. 1 is a block diagram showing the hardware configuration of an information processing device 10 according to an embodiment of the present invention. The information processing device 10 includes a processor 11, a display device 12, an input device 13, a storage device 14, and a communication device 15. The constituents 11 to 15 are connected via a bus 16. Note that an interface may be interposed, as needed, between the bus 16 and each of the constituents 11 to 15. In this embodiment, the information processing device 10 is a smartphone. Alternatively, the information processing device 10 may be a terminal, such as a tablet computer or a computer provided with a contact-type input device (e.g., touchpad), as long as the terminal includes the configuration described above.

The processor 11 controls the overall operation of the information processing device 10 and is, for example, an electronic circuit, such as a CPU or an MPU. The processor 11 executes various types of processing by loading programs and data stored in the storage device 14 and then executing the programs. In an example, the processor 11 is constituted of a plurality of processors.

The display device 12 presents the user of the information processing device 10, i.e., a player, with an application screen, etc. under the control of the processor 11. For the display device 12, a liquid crystal display, an organic EL display, a plasma display, or the like can be used.

The input device 13 is a user interface for accepting inputs to the information processing device 10 from the user. The input device 12 is, for example, a touchscreen, a touchpad, a keyboard, or a mouse. Because the information processing device 10 in this embodiment is a smartphone, the information processing device 10 includes a touchscreen, which functions both as the display device 12 and as the input device 13. The display device 12 and the input device 13 may be discrete devices that are located at different positions.

The storage device 14 includes a main memory, a buffer memory, and a storage and is a storage device provided in a general smartphone or computer, typified by a storage device using a RAM (volatile memory) or a flash memory (nonvolatile memory), such as an eMMC, a UFS, or an SSD, as well as a magnetic storage device. The storage device 14 can include an external memory. The storage device 14 stores, for example, a game application. The game application includes a game program for executing a game and various types of data and various types of tables that are referenced when the game program is executed. The game program is started in response to a user operation on the information processing device 10 and is executed on the operating system (OS) pre-installed in the information processing device 10.

In an example, the storage device 14 includes a main storage device and an auxiliary storage device. The main storage device is a volatile storage medium capable of high-speed reading and writing of information and is used as a storage area and a work area when the processor 11 processes information. The auxiliary storage device stores various types of programs, as well as data that are used by individual programs when the programs are executed. The auxiliary storage device is, for example, an SSD or a hard disk device; however, the auxiliary storage device may be any type of nonvolatile storage or nonvolatile memory, which may be of the removable type, that is capable of storing information. For example, the auxiliary storage device stores the operating system (OS), middleware, application programs, various types of data that may be referenced when these programs are executed, etc.

The communication device 15 transmits data to and receives data from other computers, such as servers, via a network. For example, the communication device 15 performs wireless communication, such as mobile communication or wireless LAN communication, to connect to the network. In an example, the information processing device 10 downloads a program from the server by means of the communication device 15 and stores the program in the storage device 14. Alternatively, the communication device 15 may perform wired communication by using, for example, an Ethernet® cable. In the case where data is neither transmitted to nor received from other computers, the information processing device 10 need not include the communication device 15.

Figure 2:
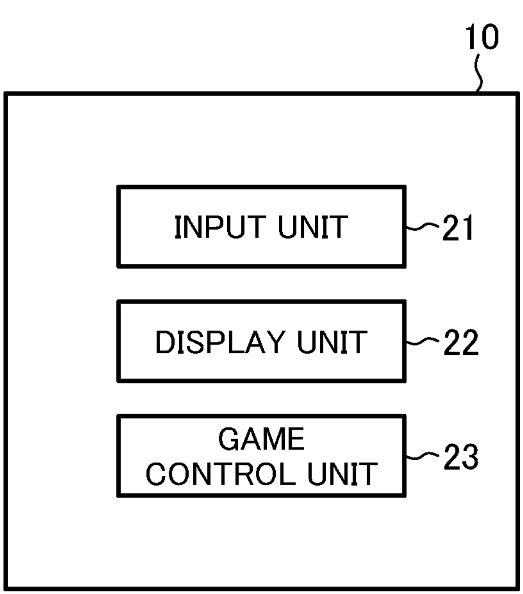
FIG. 2 is an example of a functional block diagram of the information processing device according to an embodiment of the present invention.

FIG. 2 is an example of a functional block diagram of the information processing device 10 according to an embodiment of the present invention. The electronic device 10 includes an input unit 21, a display unit 22, and a game control unit 23. In this embodiment, these functions are realized by the processor 11 executing a program. For example, the program that is executed is a game program stored in the storage device 14 or a game program received via the communication device 15. Since various types of functions are realized by loading a program, as described above, a portion or the entirety of one part (function) may be provided in another part. Various types of functions are realized as respective means as a result of a program being executed. These functions may be realized by means of hardware by configuring electronic circuits or the like for realizing the individual functions in part or in the entirety.

The input unit 21 is constituted using the input device 13 and accepts inputs to the information processing device 10 from the user. In this embodiment, a touch detection function that is provided in touchscreens and that is commonly possessed by smartphones can be used.

The display unit 22 is constituted using the display device 12 for displaying a game field 50 and displays, on the display device 12, a game screen according to the game progress and a user operation. The game control unit 23 performs basic control in executing the game in this embodiment. The game of this embodiment is a pinball game but may be any game in which game media are set on a deck and a party is organized, as described below, or may be an action game that proceeds in real time, such as a battle game. Note that a party may also be referred to as a team or a group.

Figure 3:
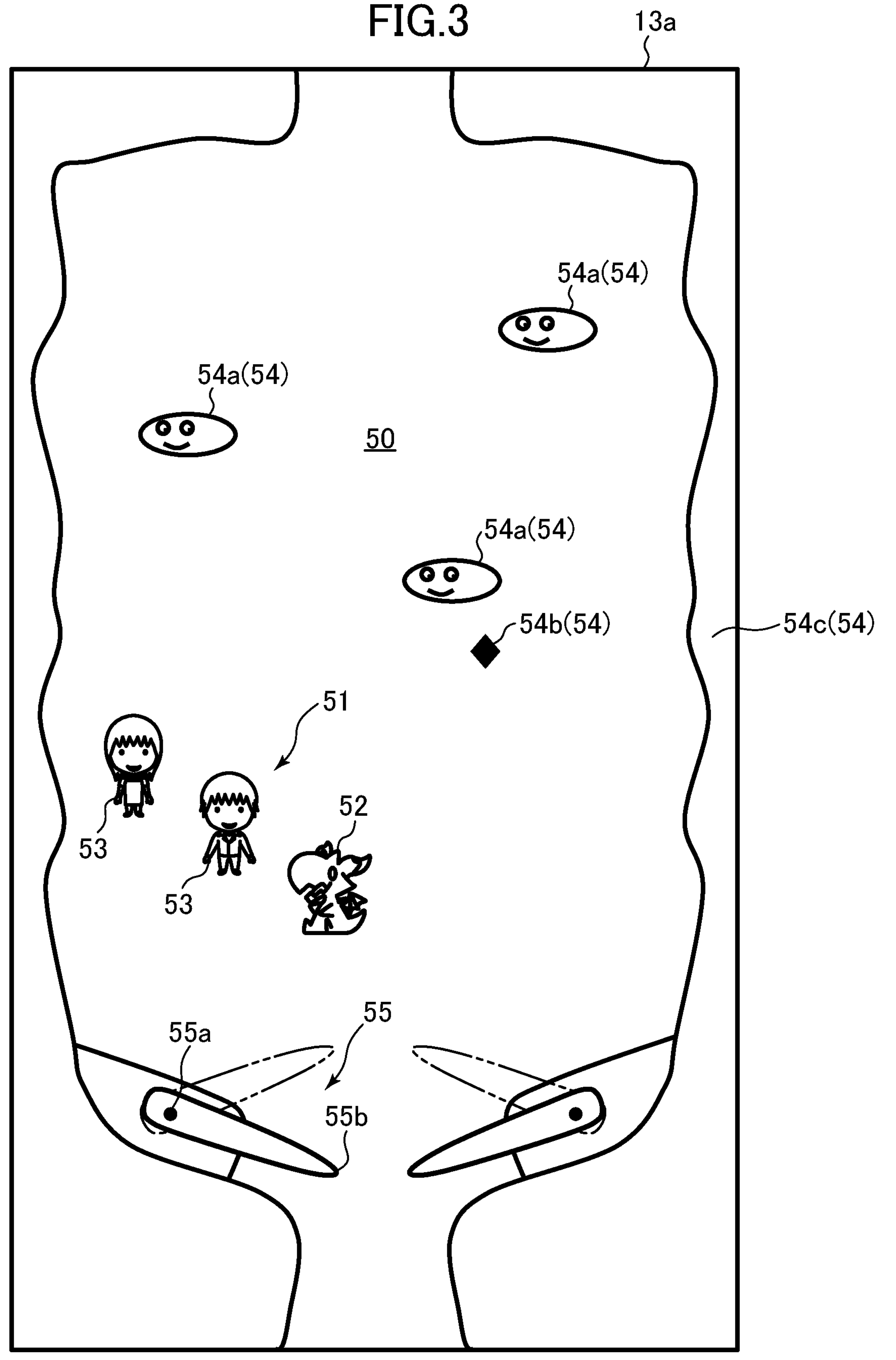
FIG. 3 is a diagram showing an example of a game screen.

FIG. 3 is a diagram showing an example of the game screen. The game control unit 23 sets the game field 50 to be displayed on the display device 12 as a virtual space for the progress of the game. The game screen shown in FIG. 3 is a screen that is displayed on the entire area or most of the area of the screen of a touchscreen 13*a* (functioning as the display device 12) of the information processing device 10. A position on the touchscreen 13*a* is identified with coordinates by using a coordinate plane comprising a vertical axis direction and a horizontal axis direction. The game control unit 23 identifies a position in the game field 50 by using coordinates. The game control unit 23 defines the vertical-axis-direction length and the horizontal-axis-direction length of the game screen as predetermined lengths, e.g., 1920 pixels and 1080 pixels, and uses the pixel values when identifying a distance or a position within the game field 50, regardless of the size or image resolution of the touchscreen 13*a*. Note that the identification of a position within the game field 50 is not limited to the above, and the game control unit 23 can use any known method allowing identification of a position within the game field 50 that is displayed in a size corresponding to the size of the game screen on touchscreens 13*a* with different sizes or screen resolutions.

The game control unit 23 generates the game field 50, which is configured as the virtual space surrounded by a virtual wall 54*c*, and arranges various objects according to the progress of the game. A party object 51, collision objects 54, and an operation object 55 are arranged in the game field 50 shown in FIG. 3.

The party object 51 is configured to include a leading object 52 that moves within the game field 50 and following objects 53 that move so as to follow the leading object 52. In an example, as shown in FIG. 3, the party object 51 includes one leading object 52 moving in first place, one following object 53 moving so as to follow the leading object 52 in second place, and another following object 53 moving so as to follow the second following object 53 in third place.

Each of the objects 52 and 53 constituting the party object 51 is a player object corresponding to a game medium selected by the user (player). A game medium is electronic data to be selected by the user, typified by player characters and equipped items, including weapons, items, and cards. A player object is an object that corresponds to a game medium and that can be directly or indirectly operated by the user. In this embodiment, a game medium is a player character, and the player objects corresponding to the respective player characters selected by the user are the leading object 52 and the following objects 53 that constitute the party object 51. The number of player objects constituting the party object 51 may be one or more and is not particularly limited. For example, the leading object 52 alone may constitute the party object 51, and the number of following objects 53 may be one, two, three or more. A group of characters corresponding to the player objects constituting the party object 51 correspond to a party or a team in an RPG game.

In this embodiment, a plurality of player characters are preset by a game administrator or the like, and each of the player characters has corresponding individual parameters and skills that are set therefor. The individual parameters include, for example, level, attacking power, defensing power, hit points (HPs), and special abilities (abilities). Special abilities (abilities) are abilities that can be expressed when a predetermined condition is satisfied, such as an ability for increasing the attacking power by a predetermined number or restoring the HPs by a predetermined number each time a predetermined number of enemy objects 54*a* are defeated, an ability for increasing the attacking power by a predetermined number or increasing, by a predetermined percentage, damage inflicted on an enemy object 54*a* with a skill at the start of a game or battle, etc. Thus, abilities are mapped to invoking conditions thereof and the levels of effect (amounts of parameter change) when they are invoked. Also, one or more categories are mapped to each ability. A skill is a unique technique of a player character that is invoked with a player input via the input device 13.

Note that because a player object is mapped to a player character, it suffices if individual parameters and skills are mapped to at least one of the player object and the player character. That is, the game control unit 23 may set the individual parameters and skills for the player character mapped to a player object or may set the individual parameters and skills for the player object mapped to a player character. In an example, the game control unit 23 can map a player object, a player character, individual parameters, and skills by means of a uniquely assigned ID. This method of setting individual parameters and skills is the same for other objects. Also, unless otherwise mentioned, individual parameters are simply referred to as parameters.

A collision object 54 is an object with which a player object constituting the party object 51 can collide and can include, for example, an enemy object 54*a*, an attacking object 54*b*, and an installation object.

The enemy object 54*a* and the attacking object 54*b* are objects that attack and damage a player object. The enemy object 54*a* corresponds to an enemy character. The attacking object 54*b* corresponds to a projectile, such as a bullet, beam, arrow, etc., shot from the enemy object 54*a* in a predetermined direction.

An installation object is an object placed in the game field 50 and, when collided with by a player object, affects the movement of the player object in the game field 50. Installation objects can include the wall 54*c* constituting the game field 50, a block (not shown), an obstacle (not shown), etc. placed within the game field 50. An installation object may be located stationarily at a predetermined position within the game field 50 or may move within the game field 50.

In the game of this embodiment, each of the characters, etc. mapped to the collision objects 54 or each of the collision objects 54 has corresponding individual parameters set therefor by the game administrator or the like. For example, in the same manner as with a player character, each of the enemy characters mapped to the enemy objects 54*a* has corresponding individual parameters set therefor. These individual parameters include the attacking power, defensing power, hit points (HPs), special abilities, etc.

The game of this embodiment includes a plurality of game fields 50 corresponding to a plurality of game stages, and the game control unit 23 can arrange objects differently for each of the game fields 50. FIG. 3 is an example of one game field 50.

The game control unit 23 sets virtual gravity on the game field 50. Virtual gravity is a phenomenon reproduced in the virtual space so as to work similarly to real world gravity. The game control unit 23 executes physics calculations using dynamic parameters including virtual gravity and a repulsion coefficient. A known physics engine can be used for the physics calculations. The game control unit 23 sets dynamic parameters, such as the mass, shape, position, speed, and repulsion coefficient, for each of the player objects, the collision objects 54, and the operation object 55. These dynamic parameters are parameters for physics calculations that differ from individual parameters, etc. corresponding to a player character. Dynamic parameters, such as the mass, shape, and repulsion coefficient, are preset by the game administrator or the like.

The leading object 52 is an object that moves at the head of the party object 51 and that corresponds to the ball in a pinball game. For this reason, the leading object 52 is an object capable of moving in the same manner as a ball. The game control unit 23 controls the movement of the leading object 52 so that it moves in the game field 50 according to the virtual gravity, and the leading object 52 thus accelerates in the direction of gravity under the influence of the virtual gravity. In the game field 50 shown in FIG. 3, the direction of gravity is downward.

The game control unit 23 controls the movement of following objects 53 so that they follow the trajectory of the leading object 52 in the game field 50. Therefore, the party object 51 moves in a single line as a whole. Preferably, the game control unit 23 controls the movement of the following objects 53 so that they move so as to follow the leading object 52 at a fixed distance from the leading object 52. Also preferably, the game control unit 23 controls the movement of the following objects 53 so that they move so as to follow the leading object 52 with a fixed interval between the following objects 53.

The game control unit 23 determines whether there is a collision between the leading object 52 of the party object 51 and a collision object 54 including an enemy object 54*a* and the attacking object 54*b*, as well as a collision between the leading object 52 and the operation object 55. Known methods can be used for collision determination (hit determination).

If the game control unit 23 determines that the leading object 52 and an enemy object 54*a* have collided, it calculates, by using the dynamic parameters of each of the objects, the physical quantity acting on the leading object 52 at the time of collision. The game control unit 23 determines the speed of the leading object 52 using the physical quantity resulting from the calculation and moves the leading object 52. Thus, the game control unit 23 executes physics calculations related to the bouncing motion of the leading object 52 at the time of collision. The same also applies when the leading object 52 collides with the operation object 55 or an installation object such as the virtual wall 54*c*.

When the game control unit 23 determines that the leading object 52 and an enemy object 54*a* have collided, it changes, on the basis of individual parameters set in the leading object 52, individual parameters set in the enemy object 54*a* that has been determined to have had the collision.

In an example, when the game control unit 23 determines that the leading object 52 and an enemy object 54*a* have collided, it determines that the player character mapped to the leading object 52 has damaged the enemy character mapped to the enemy object 54*a*. At this time, the game control unit 23 calculates the amount of damage from individual parameters, such as the attacking power, set in the player character mapped to the leading object 52. Subsequently, the game control unit 23 uses the calculated amount of damage to change individual parameters of the enemy character mapped to the enemy object 54*a* that has been determined to have had the collision, such as decreasing the HPs of the enemy character.

If a collision object 54, including an enemy object 54*a*, is set as an object that is not affected by the virtual gravity, the game control unit 23 can keep the enemy object 54*a* located at a position that contributes to higher gameplay. In an example, an enemy object 54*a* (enemy character) emits the attacking object 54*b*, and when any player object of the party object 51 collides with the attacking object 54*b*, the game control unit 23 determines that the player object that has collided is damaged. At this time, the game control unit 23 changes parameters of the player character mapped to the player object, such as decreasing the HPs of the player character. However, a collision object 54 can be an object that is not affected by the virtual gravity.

The operation object 55 is an object that is operated by the user and includes a ball-hitting object corresponding to a flipper in the pinball game. As shown in FIG. 3, the operation object 55 includes a pair of ball-hitting objects.

Each of the pair of ball-hitting objects revolves by a predetermined angle or a predetermined distance so that another end portion 55*b* is displaced up and down about one outer end portion 55*a*.

In an example, when the game control unit 23 determines that the leading object 52 and the operation object 55 have collided, it executes physics calculations related to the bouncing motion at the time of collision and determines the speed of the leading object 52 using the results of physics calculations. Preferably, the game control unit 23 corrects the force applied from the operation object 55 to the leading object 52 and the angle of the force in consideration of user operability. Note that the operation object 55 may include a single ball-hitting object or three or more ball-hitting objects.

The game control unit 23 operates the operation object 55 on the basis of a user touch detected by the touchscreen 13*a* of the information processing device 10. More specifically, when the touchscreen 13*a* accepts a touch, the game control unit 23 displaces the other end portion 55*b* of each of the ball-hitting objects to a predetermined position that is further upward than when the touchscreen 13*a* does not detect a touch. The game control unit 23 keeps the other end portion 55*b* of the ball-hitting object in the predetermined position as long as the touchscreen 13*a* is accepting a touch. In an example, the game control unit 23 can accept touches at all positions detectable by the touchscreen 13*a* and execute the same processing. The operation object 55 collides with a player object similarly to a collision object 54, but differs from a collision object 54 in that it is operated with a user input.

In the game of this embodiment, the player can generate a special effect by invoking a skill. A skill is mapped to each player character, and each player character is assumed to possess only one skill. Skills can be, for example, a skill that inflicts large damage on an enemy character, a skill that generates an effect such as restoring the HPs of a player character, etc. A skill can be invoked by consuming the entire skill gauge, for example, when the skill gauge, which accumulates at a predetermined rate, is at the maximum.

In an example, a skill can be invoked by a swipe input. A swipe input is an operation input in which the player's finger or the like is brought into contact with the touchscreen 13*a* of the information processing device 10, is moved while maintaining the contact, and is then released from the touchscreen 13*a*, and includes a slide operation and a flick operation. In an example, the swipe directions in which skills are invoked can be set to different directions for each of the player characters corresponding to the player objects constituting the party object 51. On condition that the skill gauge is at its maximum, for example, the skill of the leading object 52 can be invoked with a swipe input in the left direction, the skill of the second following object 53 following the leading object 52 can be invoked with a swipe input in the upward direction, and the skill of the third following object 53 can be invoked with a swipe input in the right direction. The game control unit 23 of this embodiment invokes the skill of a player object by executing a skill process mapped to the player object on the basis of a player input such as a swipe input.

Figure 4:
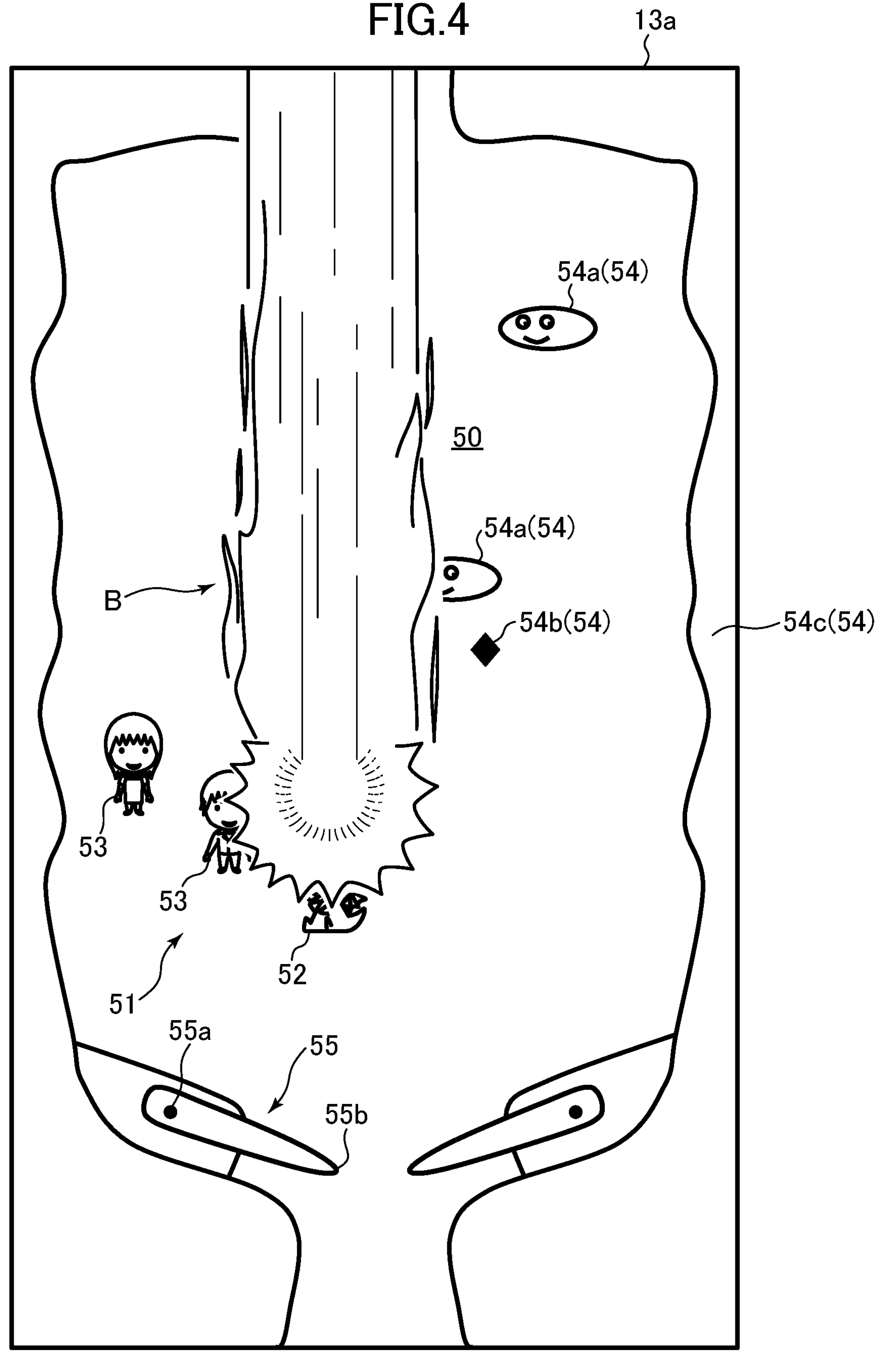
FIG. 4 is a diagram showing an example of the game screen and shows a skill that is invoked by the player character corresponding to a leading object to fire a beam upward and damage an enemy object while the player character stops for a predetermined time period at a position in a game field when invoking the skill.

A wide variety of skills are preset for player characters. For example, skills include: a skill that is invoked by a player character to fire a beam upward and damage an enemy object 54*a* while the player character stops for a predetermined time period at a position in the game field 50 when invoking the skill; a skill that is invoked by a player character to damage an enemy object 54*a* colliding with the player character after the player character has moved in a predetermined direction (e.g., to the right) for a predetermined time period or by a predetermined number of pixels; a skill that is invoked by a player character who moves according to the virtual gravity and damages an enemy object 54*a* present within the range of an attacking aura around the player character himself/herself; and a skill that is invoked by a player character who shoots an arrow to damage an enemy object 54*a* hit by the shot arrow and that causes the HPs of all the player characters corresponding to the player objects constituting the party object 51 to recover by a predetermined number each time the player character shoots an arrow. FIG. 4 shows a skill that is invoked by the player character corresponding to the leading object 52 to fire a beam B upward and damage an enemy object 54*a* while the player character stops for a predetermined time period at a position in the game field 50 when invoking the skill.

The skill process is a series of processes for executing the skill mapped to a player character and can include some processes with priority mapped thereto and other processes without priority mapped thereto. Some priority-mapped processes can include at least one of a movement process, a skill presentation display process, and a skill effect process. The movement process is a process for moving, within the game field 50, the player objects constituting the party object 51 in which a skill has been invoked according to the movement modes included in the skills of the player characters corresponding to those player objects. The skill presentation display process is a process for displaying the presentation of a skill on the display device 12. The skill effect process can include a process for changing individual parameters resulting from a skill effect during skill invoking, such as increasing the attacking power by a prescribed amount and recovering the HPs by a prescribed amount.

Figure 5:
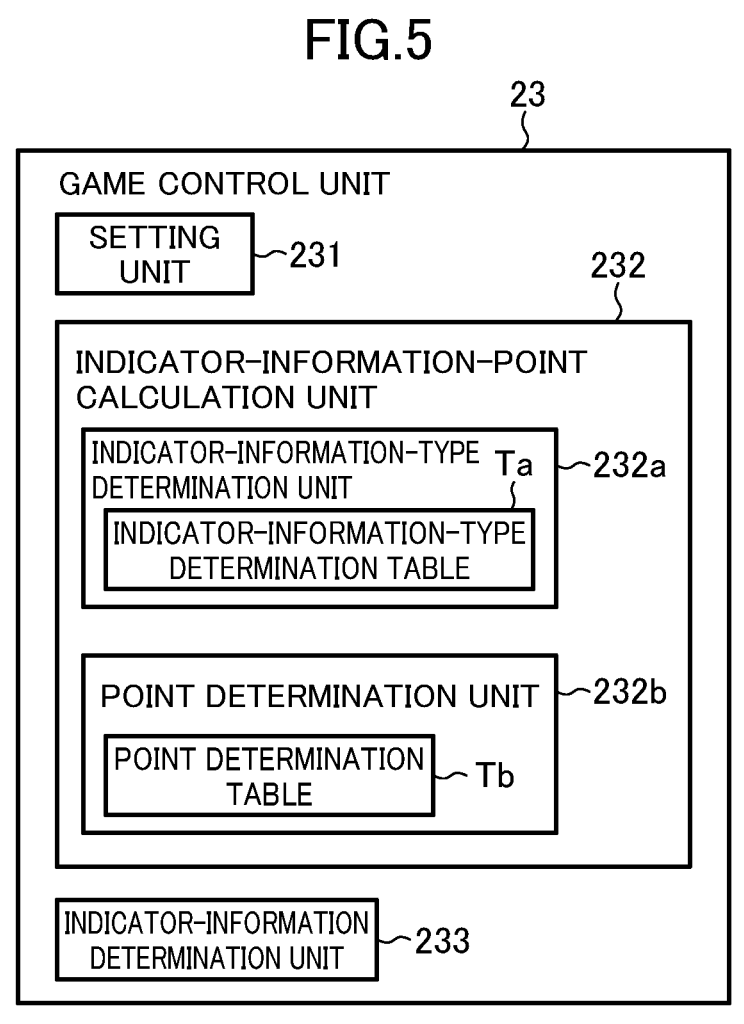

FIG. 5 is an example of a functional block diagram of the game control unit. The game control unit 23 includes a setting unit 231, an indicator-information-point calculation unit 232, and an indicator-information determination unit 233.

The setting unit 231 is configured to include the processor 11 and sets two or more game media on a deck with which indicator information is associated. A deck is a medium for organizing a party (team) and has two or more setting frames for player characters. The two or more game media are player characters selected by the player via the input unit 21 (input device 13). One party (team) is configured from the plurality of player characters selected by the player. In an example, the setting unit 231 sets a party by storing the selected player characters in the storage device 14 with a common party ID mapped to the player characters. A party is a group of game media used in a game. Indicator information is information indicating properties possessed by a party and will be described below in detail.

The setting unit 231, in addition to selection of the above-described player characters, can accept the player's selection of another player character mapped to each of the selected player characters. The player characters constituting a party are referred to as first player characters, and player characters mapped to the first player characters are referred to as second player characters. In an example, the setting unit 231 accepts the player's selection of a first player character and a second player character via the input unit 21 (input device 13) and stores the mapping between the selected first player character and the second player character in the storage device 14, thereby setting the mapping between the first player character and the second player character. By doing so, it is possible to set the configuration of the party.

In this embodiment, the player's selection of a player character is made by selecting the first player character from a predetermined common group of player characters and selecting the second player character from the remaining characters in the group of player characters. Because the number of combinations can be larger when a selection is made from a common group of player characters than when a selection is made from a predetermined group of characters for the first player character and from a predetermined group of characters for the second player character, a variety of organizations are possible, contributing to enhanced gameplay. Note that the order of selection may be reversed, more specifically, a second player character may be selected first, and then a first player character may be selected from the remaining characters. In addition to the above-described selection, it is also possible to make a selection from a group of characters for the first player character and a group of characters for the second player character, respectively.

The relationship between the first player character and the second player character may be an equal relationship, but the setting unit 231 in this embodiment sets a master-subordinate relationship. That is, the first player character is set as a main character, and the second player character is set as an auxiliary character that assists the first player character. The first player character is selected to determine the main character, and the second player character is selected to determine the auxiliary character that assists the main character. As in the above, the order of selection may be reversed, more specifically, an auxiliary character may be determined first, and a main character may then be determined.

If the first player character and the second player character are in a master-subordinate relationship, the auxiliary character can be viewed as an item equipped on the main character to assist the main character. An auxiliary character is also referred to as a unison character because the main character is equipped (in unison) with the auxiliary character. In a mode of assistance, for example, the auxiliary character's attacking power, HPs, skill, and abilities can be added to the main character's attacking power including at least skill, HPs, skill, and abilities because the auxiliary character itself has attacking power, HPs, skill, and abilities.

In an example, with a swipe in a predetermined direction as a trigger, the skill of the main character and the skill of the auxiliary character mapped to the main character are invoked (typically simultaneously). In an example, the skill presentation display process and the skill effect process included in the main character's skill process are executed concurrently (typically simultaneously) with the skill presentation display process and the skill effect process included in the auxiliary character's skill process. In addition, a collision determination process may also be executed as needed. For example, the main character's skill presentation (e.g., draping the main character with an attacking aura) and the auxiliary character's skill presentation (shooting an arrow around) are displayed on the display device 12 in a superimposed manner, and the skill effect process is executed so that a predetermined amount of damage is inflicted on an enemy object 54*a* if the enemy object 54*a* is located within the range of the attacking aura, and a predetermined amount of damage is inflicted on an enemy object 54*a* if it is determined that the arrow has collided with the enemy object 54*a*.

In this embodiment, due to the setting of a master-subordinate relationship, the game control unit 23 displays, in the game field 50, the player objects corresponding to the main characters, and does not display the auxiliary objects corresponding to the auxiliary characters. That is, the auxiliary objects are hidden. However, the auxiliary objects may also be displayed in the game field 50, and if there is no master-subordinate relationship between a first player object and a second player object (i.e., if the first player object and the second player object are in a flat relationship), both may be displayed. Note that the leading object 52 and a following object 53 are both player objects corresponding to the main characters and not auxiliary objects.

The setting unit 231 can set the mapping between a first player character and a second player character for each of a plurality of player objects. In the example shown in FIG. 3, because there are three player objects that constitute the party object 51, the setting unit 231 sets: the mapping between the main character corresponding to the leading object 52 and the auxiliary character assisting the main character; the mapping between the main character corresponding to the second following object 53 and the auxiliary character assisting the main character; and the mapping between the main character corresponding to the third following object 53 and the auxiliary character assisting the main character. Therefore, in this case, six characters are selected from among the single common group of characters.

The setting unit 231 can set one (e.g., first player character) of the plurality of player characters as the leader of the party.

The setting unit 231 can set an equipped item in each of the player characters (e.g., the first player character, the second player character, or both). An equipped item is a type of game media and is selected by the player from a set of equipped items possessed by the player. The selected equipped item is mapped to each of the selected player characters, and the mapping is stored in the storage device 14.

The indicator-information-point calculation unit 232 is configured to include the processor 11 and determines points for each item of indicator information on the basis of predetermined data associated with the game media. Indicator information is information indicating properties possessed by the party, and a plurality of items of indicator information are set in association with the game. In an example, indicator information is a predetermined character string, an image, or a combination thereof. The character string or image indicates the properties of the organized party and may be referred to as a tag. This character string can be set, as appropriate. The character string serving as indicator information can be, for example, "enemy destroyed", "HPs condition", "number of skills invoked", etc. "Enemy destroyed" is mapped to an invoking condition such as "every time a predetermined number of enemies are defeated". "HPs condition" is mapped to an invoking condition such as "when the HPs are equal to or higher (or lower) than a predetermined percentage". "Number of skills invoked" is mapped to an invoking condition such as "each time a skill is invoked".

Predetermined data associated with a game medium can be: data related to the invoking condition or effect of an ability associated with the game medium; data related to the invoking condition or effect of the skill associated with the game medium; data related to the invoking condition or effect of an ability of the equipped item associated with the game medium; or a combination of two or more of these items of data. In this embodiment, predetermined data associated with a game medium is data related to the invoking condition of an ability associated with the game medium.

In an example, if an ability causes the attacking power to increase by a predetermined number each time a predetermined number of enemy objects 54*a* are defeated, data related to the invoking condition or effect of the ability is the number of enemy objects 54*a* to be defeated and the value of the attacking power to be increased. In an example, if the skill associated with a game medium is a skill that is invoked upon a player operation after the skill gauge has reached the maximum, data related to the invoking condition or effect of the skill is the maximization of the skill gauge and the level of effect resulting from the player operation and the skill invoking. If an ability of the equipped item associated with a game medium causes the HPs to recover by a predetermined number each time a predetermined number of enemy objects 54*a* are defeated, data related to the invoking condition or effect of the ability is the number of enemy objects 54*a* to be defeated and the value of HPs to be recovered.

An ability is a power that can be expressed by satisfying a predetermined condition, and an invoking condition, as well as the level of effect (amount of parameter change) at the time the ability is invoked, is mapped to the ability. An ability may include a skill. Also, one or more categories are mapped to each ability. That is, one ability is mapped to ability categories dependent on the game media. One ability is mapped to, for example: a leader category if the game medium is a player character that is the leader in the party; a character category if the game medium is just a player character that is not the leader (e.g., main or auxiliary character); and an equipment category if the game medium is an equipped item. Note that an ability in the leader category is invoked only if the game medium is the leader. An ability in the character category is invoked whether the game medium is the leader or not.

The indicator-information-point calculation unit 232 has an indicator-information-type determination unit 232*a* and a point determination unit 232*b*.

The indicator-information-type determination unit 232*a* determines the type of indicator information associated with predetermined data on the basis of an indicator-information-type determination table Ta and the predetermined data. The indicator-information-type determination table Ta is data in which predetermined data and the type of indicator information are associated. Here, the type of indicator information is associated with the invoking condition of an ability associated with the game medium. In an example, indicator information "enemy destroyed" is associated with the ability invoking condition of defeating enemies a predetermined number of times. In another example, indicator information "HPs condition" is associated with the ability invoking condition of HPs being equal to or higher than a predetermined percentage.

In other words, when a game medium is set by the setting unit 231, the type of indicator information corresponding to an ability of the game medium can be determined with the indicator-information-type determination table Ta. In an example, the indicator-information-type determination table Ta is stored in advance in the storage device 14.

The point determination unit 232*b* determines points on the basis of a point determination table Tb and the category related to predetermined data. The point determination table Tb is data in which the category related to predetermined data is associated with points. The categories related to predetermined data are categories mapped to the predetermined data, and points are mapped to each of these categories. The category related to predetermined data is a category mapped to, for example, an ability, a skill, or an equipped-item ability. Here, the category mapped to an ability associated with a game medium is associated with points. In an example, categories, such as a leader category, a character category, and an equipped-item category, are mapped to one ability, and points are allocated to each of the categories. An ability in the leader category is an ability that is invoked when the game medium is the leader, and can be assigned a higher level of importance because many of the abilities in the leader category are powerful abilities. The strength of abilities can be designed, as appropriate, by the game developer, and the distribution of points can be designed according to the strength of the abilities. For example, the points for the leader category can be set to 30 points, and the points for the other player characters and equipped items can be set to 20 and 10 points, respectively.

In other words, when a game medium is set by the setting unit 231, the points for the indicator information corresponding to an ability of the game medium can be determined from the point determination table Tb. In an example, the point determination table Tb is stored in advance in the storage device 14.

The indicator-information-point calculation unit 232 adds, for each item of indicator information, the points for the various items of indicator information determined by the point determination unit 232*b*. For one item of indicator information, points based on abilities, etc. of one or more game media can be added. For example, if there is one ability associated with each of six player characters including three main characters and three auxiliary characters, then 0 to 6 points may be added for one item of indicator information. In an example, in the first indicator information, points based on an ability of one main character are added, and in the second indicator information, points based on abilities of three main characters and points based on an ability of one auxiliary character are added. In the third indicator information, the points to be added are 0 (i.e., no abilities to be added to the third indicator information are associated with the six player characters), and in the fourth indicator information, the points based on the abilities of two auxiliary characters are added.

Figure 6:
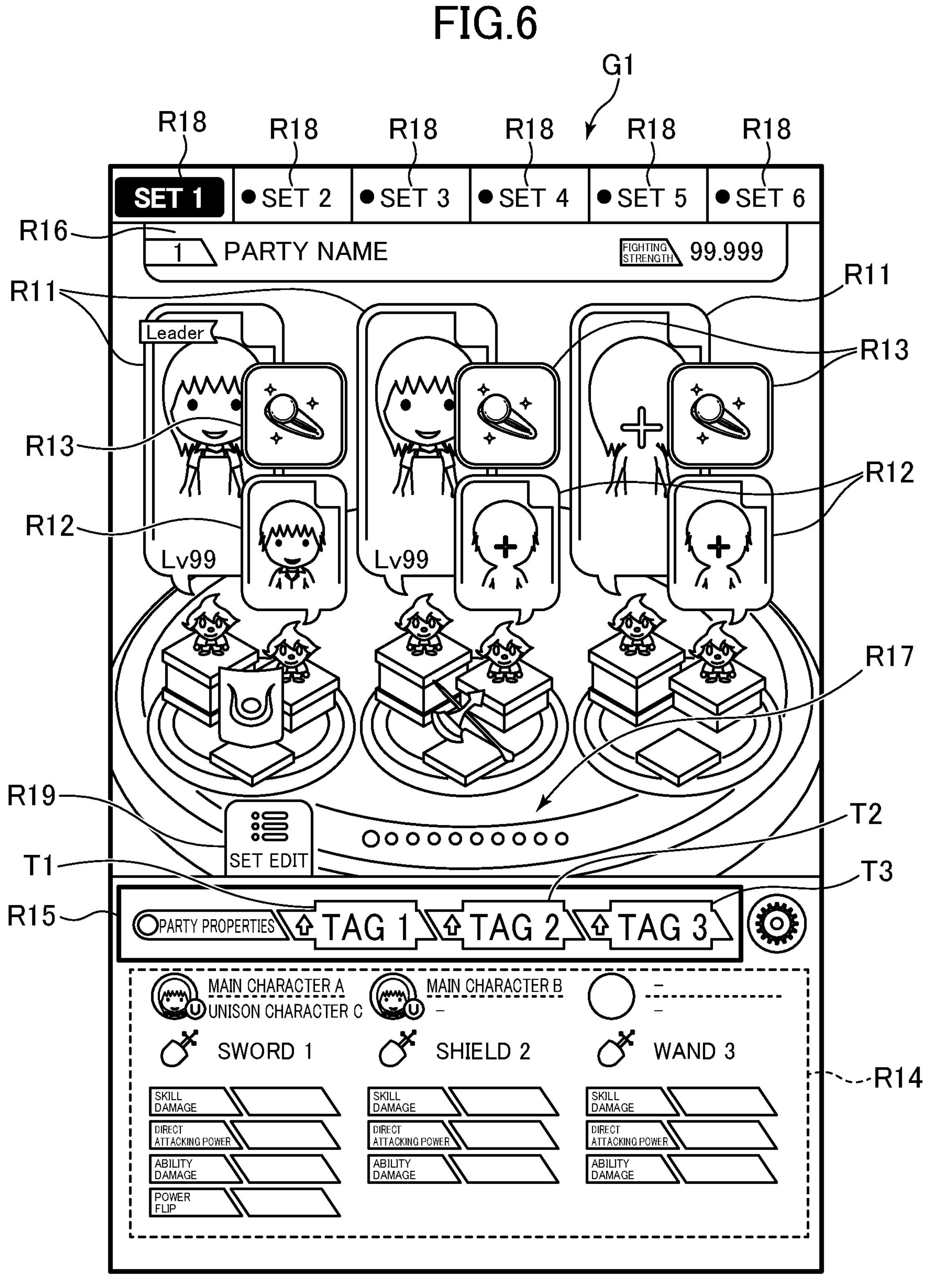
FIG. 6 is an example of a party organization screen.

The indicator-information determination unit 233 determines the indicator information to be displayed on the game screen on the basis of the points for each item of indicator information obtained by the indicator-information-point calculation unit 232 and associates the determined indicator information with the deck. More specifically, the indicator-information determination unit 233 determines, as the indicator information to be displayed on the game screen, a predetermined number of items of indicator information with the highest points out of all items of indicator information. For example, the predetermined number with the highest points can be, but is not limited to, three. The game screen can be a party (team) organization screen, a party selection screen (not shown) for selecting a party to be used in the game, or a game screen, as shown in FIG. 3. In this embodiment, as shown in FIG. 6, the indicator-information determination unit 233 displays the determined predetermined number of items of indicator information on the party organization screen.

The indicator-information determination unit 233 determines the positions of the indicator information on the game screen on the basis of the points. In an example, the indicator-information determination unit 233 can place the indicator information in descending order of points, starting from the left on the game screen.

In addition, the indicator-information determination unit 233 can also determine that only the indicator information with points above a predetermined value is the indicator information to be displayed on the game screen. The number of items of indicator information to be displayed on the game screen determined by the indicator-information determination unit 233 is not particularly limited, but in the example shown in FIG. 6, the number is three. In addition, if there are two or less items of indicator information with points above a predetermined value, then 0 to 2 items of indicator information may be displayed. Furthermore, if there are 0 items of indicator information with points above a predetermined value, the indicator-information determination unit 233 may indicate "no properties", "no features", etc., instead of the indicator information.

In the foregoing, when a game medium is set in the deck, the indicator information to be displayed on the game screen is determined on the basis of the invoking condition, etc., of a valid ability pre-associated with the game medium. However, an ability associated with that game medium may be enabled or changed in response to a change in parameter, such as an increase in the level of the game medium, so that the indicator information to be displayed on the game screen may be determined by the indicator-information-point calculation unit 232 and the indicator-information determination unit 233 on the basis of the enabled ability. That is, a game medium may have a plurality of abilities pre-associated therewith according to the level of the game medium or the level of the player (also referred to here simply as "level"), so that abilities the levels of which have not reached an ability level are disabled and abilities the levels of which have reached the ability level are enabled (that is, made available for use in the game).

FIG. 6 is an example of the party organization screen. As shown in FIG. 6, the setting unit 231 displays a party organization screen G1 on the display device 12 and accepts the player's selection of player characters, equipped items, etc. via the input device 13. In an example, the party organization screen G1 can be displayed by pressing an organization button displayed on the home screen (not shown in the figure).

In the example shown in FIG. 6, the party organization screen G1 includes first player character setting regions R11, second player character setting regions R12, equipped-item setting regions R13, a player character information display region R14, an indicator information display region R15, a party name display region R16, a party switching region R17, SET switching tabs R18, and a SET edit button R19.

A first player character setting region R11 is a region for setting a first player character. When a region R11 is tapped by the player, the party organization screen G1 transitions to a player character group display screen (not shown in the figure), and the player's selection of a first player character from among the plurality of player characters displayed on the player character group display screen is accepted. After the selection has been accepted and the screen has returned to the party organization screen G1, the image of the selected first player character is displayed in the first player character setting region R11. If no player characters have been set, an indication (e.g., a "+" mark) is displayed indicating that no characters have been set, as shown in the rightmost first player character setting region R11 in FIG. 6.

Note that one of the first player character setting regions R11 may be used as a region for setting a first player character serving as the leader.

A second player character setting region R12 is a region for setting a second player character. When a region R12 is tapped by the player, the party organization screen G1 transitions to the player character group display screen (not shown in the figure), and the player's selection of a second player character from among the plurality of player characters displayed on the player character group display screen is accepted. After the selection has been accepted and the screen has returned to the party organization screen G1, the image of the selected second player character is displayed in the second player character setting region R12. If no player characters have been set, an indication (e.g., a "+" mark) is displayed indicating that no characters have been set, as shown in the rightmost second player character setting region R12 in FIG. 6.

An equipped-item setting region R13 is a region for setting an equipped item. When a region R13 is tapped by the player, the party organization screen G1 transitions to an equipped-item-group display screen (not shown in the figure), and the player's selection of an equipped item from among the plurality of equipped items displayed on the equipped-item-group display screen is accepted. After the selection has been accepted and the screen has returned to the party organization screen G1, the image of the selected equipped item is displayed in the equipped-item setting region R13. If no equipped items have been set, an indication (e.g., a "+" mark) is displayed in the equipped-item setting region R13, indicating that no equipped items have been set. In the example shown in FIG. 6, an equipped item can be set for each of the first player characters but may also be set for each of the second player characters.

The player character information display region R14 is a region in which information regarding the game media set in the regions 11-13 is displayed. In the example shown in FIG. 6, the names of the first player characters, second player character, and equipped items, as well as various parameters of the first player characters or various parameters counting the parameters of the first and second player characters and equipped items, are displayed.

The indicator information display region R15 is a region in which the indicator information determined by the indicator-information determination unit 233 is displayed. In the example shown in FIG. 6, three items of indicator information T1-T3 are displayed. For example, the items of indicator information with higher points are displayed from left to right. In other words, the position of the indicator information T1 is the position at which the most important indicator information in terms of party property is placed, and the position of the indicator information T3 is the position at which indicator information of relatively low importance is placed. Note that the wording "relatively low importance" here means relatively low importance among the displayed items of indicator information, but indicates high importance among all items of indicator information. What are displayed here can be character strings or images indicating the properties of the indicator information. The indicator information display region R15 can be displayed in an easy-to-notice position on the party organization screen G1. In the example shown in FIG. 6, the indicator information display region R15 is displayed in the center portion of the party organization screen G1 but can also be displayed at the top of the party organization screen G1.

The party name display region R16 is a region for displaying the name of the party. This region R16 can accept the party name specified by the player and display the accepted name.

The party switching region R17 is a region for accepting an operation for switching the party to be organized. In the region R17, the same number of circles as the number of parties that can be organized are displayed, and the circle for the party to be organized is displayed in a large size. To switch the party to be edited, the region R17 can be swiped by the player to switch to the party organization screen G1 for the party to be organized. In the example shown in FIG. 6, ten circles are displayed in the region R17. In other words, ten parties can be set and organized per SET.

A SET switching tab R18 is a tab for switching the SET of parties. In each of the SETs, a plurality of parties can be set and organized. In the example shown in FIG. 6, six SET switching tabs R18 are displayed. Therefore, in the example shown in FIG. 6, a total of 60 parties can be set and organized.

The SET edit button R19 is for editing parties, such as re-ordering or deleting parties, in each of the SETs. When the SET edit button R19 is pressed, the screen transitions to a SET edit screen G2.

Figure 7:
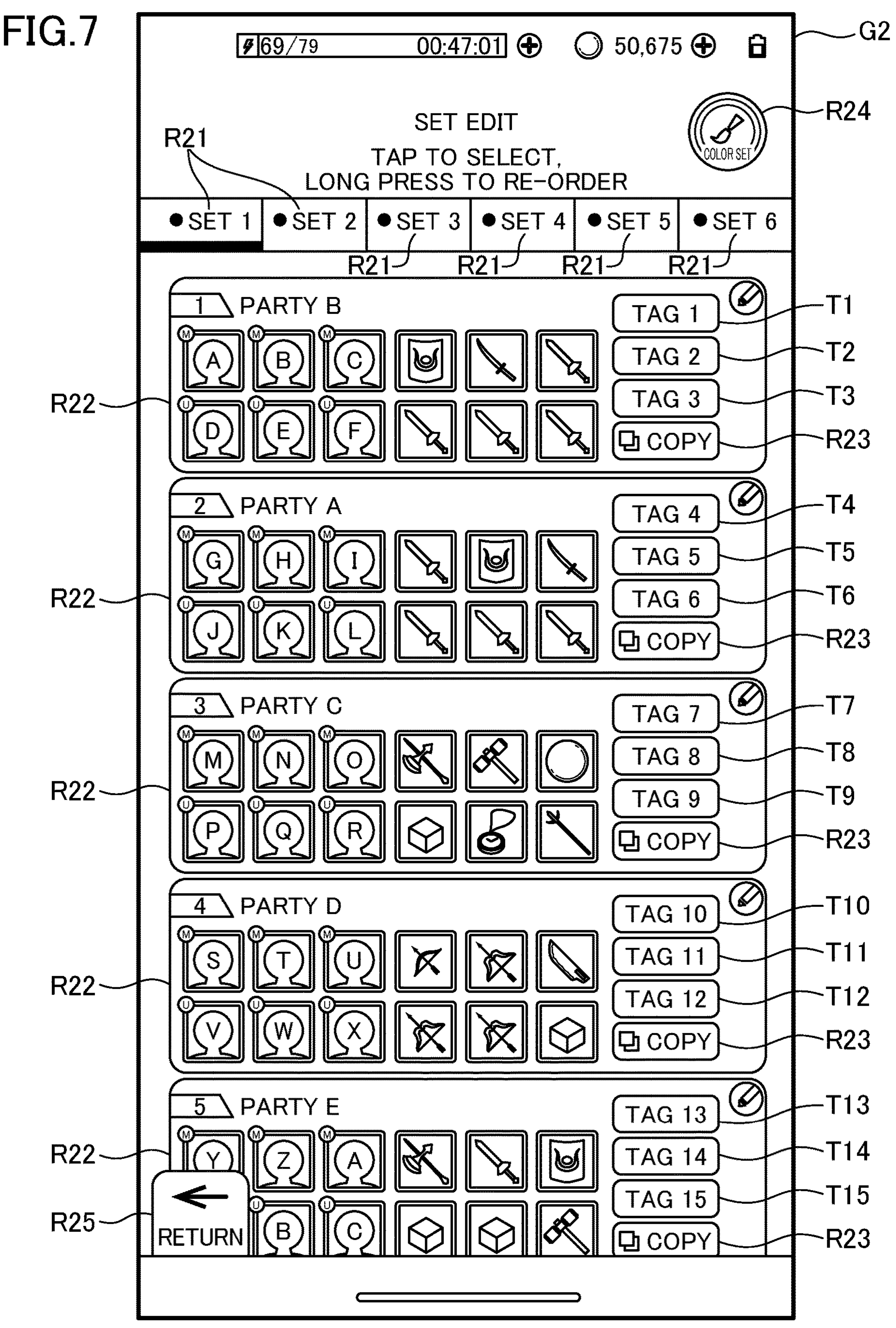
FIG. 7 is an example of a SET edit screen.

FIG. 7 is an example of the SET edit screen. The SET edit screen G2 includes SET switching tabs R21, party display regions R22, copy buttons R23, a color setting button R24, and a return button R25.

A SET switching tab R21 is a tab for switching between SETs of parties. In the example shown in FIG. 7, six SET switching tabs R21 are displayed and a tab SETa is selected.

A plurality of party display regions R22 are provided on the SET edit screen G2. In each of the party display regions R22, the name of the party, images of the set player characters and equipped items, indicator information of the party, and the copy button R23 are displayed. In the example shown in FIG. 7, an equipped item is set for each of the player characters. In the party display regions R22, indicator information T1 to 15 indicating properties of the parties are displayed. In each of the party display regions R22, the party can be selected by a tap operation made by the player via the input device 13 and can then be edited. In addition, when each of the party display regions R22 is pressed for a long time by the player via the input device 13, the parties in the SET can be re-ordered.

With the copy button R23, it is possible to copy the party corresponding to the selected party display region R22 and organize the copied party in another SET. This reduces the time and effort required to organize the same party again.

The color setting button R24 is used to set a color for each SET. When the color setting button R24 is pressed, a color setting screen (not shown in the figure) is displayed on the display device 12 to accept color selection made by the player. The accepted color can be reflected in the SET switching tab R21 and each of the party display regions R22. This allows the player to grasp the properties of the party group in each SET by color.

The return button R25 is a button for returning to the party organization screen G1.

Operation

Party Organization Process

Figure 8:
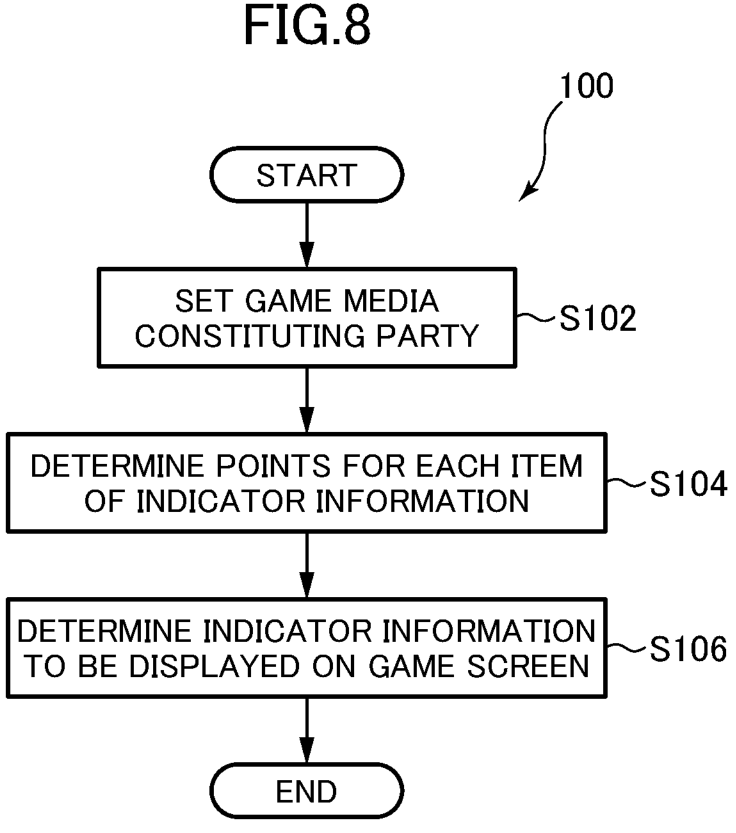
FIG. 8 is an example of a flowchart for a party organization process executed in the information processing device according to an embodiment of the present invention.

A party organization process 100 executed in the information processing device 10 according to an embodiment of the present invention will be described with reference to FIG. 8.

First, the information processing device 10 sets game media that constitute a party by accepting, by means of the setting unit 231, the player's selection of game media (player characters, equipped items, etc.) via the input device 13 (S102). This associates the selected game media such as player characters, equipped items, etc. with the deck and configures a party.

Next, the indicator-information-point calculation unit 232 determines the points for each item of indicator information on the basis of predetermined data associated with the game media (S104). The predetermined data associated with the game media here are invoking conditions of abilities associated with the game media. The indicator-information-point calculation unit 232 determines the types of indicator information to which points are added on the basis of the invoking conditions of the abilities and the indicator-information-type determination table Ta. In addition, the indicator-information-point calculation unit 232 also determines points for the determined types of indicator information on the basis of the categories mapped to the abilities and the point determination table Tb. Thus, the indicator-information-point calculation unit 232 determines the points for all items of indicator information. Note that in step S104, the points added to indicator information that does not correspond to indicator information to which points are added according to the indicator-information-type determination table Ta can be set to 0 points.

The indicator information to be displayed on the game screen is determined by the indicator-information determination unit 233 (S106). More specifically, the indicator information to be displayed on the game screen is determined on the basis of the points for each item of indicator information obtained in S104, and the determined indicator information is associated with the deck. In an example, a predetermined number of items of indicator information with the highest points are determined as the indicator information to be displayed on the game screen.

The indicator information determined and displayed in this manner can be used to grasp the properties of the organized party. For example, indicator information can be used for the player to select a party to be used in the game among the organized parties and to edit the organized party.

Game Process

Figure 9:
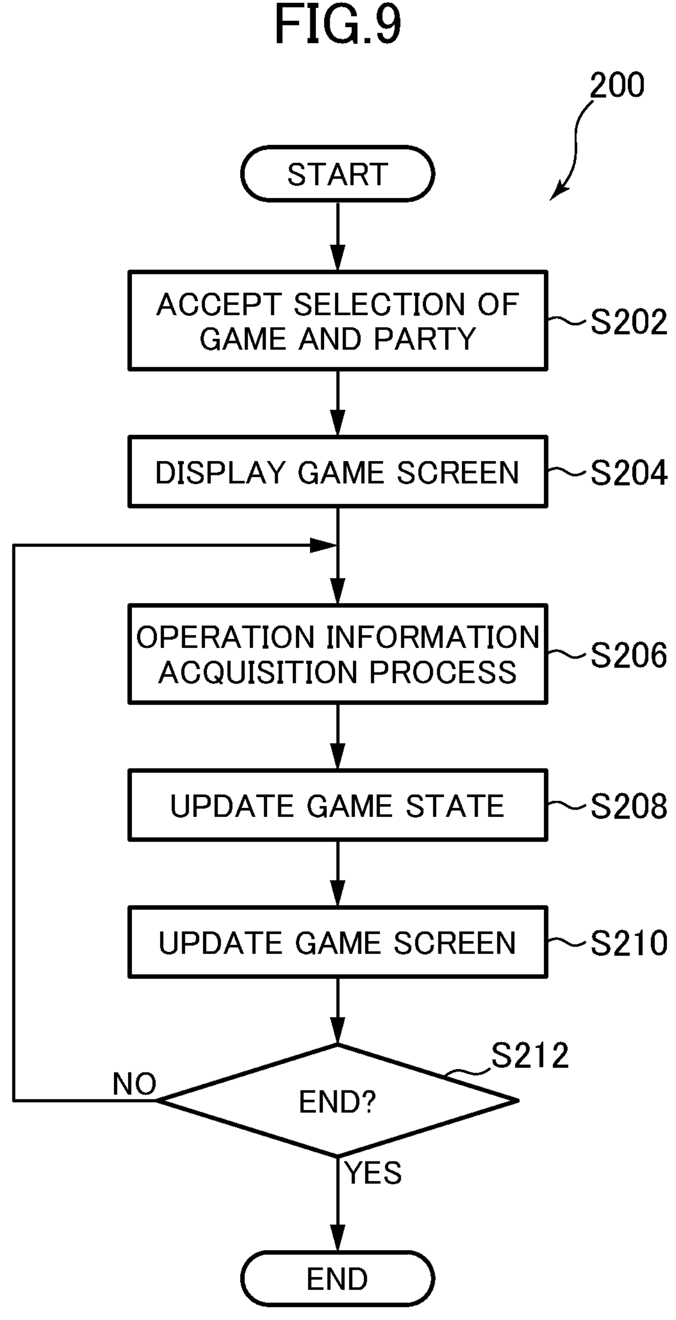
FIG. 9 is an example of a flowchart for a game process executed in the information processing device according to an embodiment of the present invention.

A game process 200 executed in the information processing device 10 according to an embodiment of the present invention will be described with reference to FIG. 9. Note that in this embodiment, a smartphone is used as the information processing device 10. Generally, in smartphones, the frame rate is set to 30 fps, 60 fps, or the like. The information processing device 10 preferably executes processes at regular intervals corresponding to the frame rate. In addition, it is assumed here that a party used in the game has already been organized through the party organization process 100.

First, the information processing device 10 accepts the player's selection of a game and a party to be used in the game (S202). When a party is to be selected, indicator information is displayed on the display device 12, as shown in FIG. 6 or 7, so that the player can grasp the properties of the party. Therefore, the convenience to the player can be enhanced.

Upon starting the game, the information processing device 10 displays the game screen including the game field 50 as shown in FIG. 3 (S204). Next, the information processing device 10 executes an operation information acquisition process for acquiring information concerning the player's touch input to the touchscreen 13*a*, which functions as the input unit 21 (S206). The game control unit 23 continuously executes the skill process concurrently with the game process 200 until the game ends. The skill process is executed on the basis of the operation information acquired in the game process 200.

Next, the information processing device 10 updates the game state (S208). The game state includes information concerning the dynamic and individual parameters of various objects, collision determination, and the game field 50. For example, on the basis of the dynamic parameters in the previous frame, the elapsed time from a preceding frame, the virtual gravity, the result of collision determination in the previous frame, etc., the information processing device 10 updates the positions and velocities of various objects by updating the dynamic parameters of the various objects. For example, the elapsed time is calculated from the frame rate and the number of elapsed frames.

The information processing device 10 makes a collision determination on the basis of the updated dynamic parameters of the various objects. Furthermore, on the basis of the result of collision determination in the frame, invoked skills, and individual parameters in the previous frame, etc., the information processing device 10 updates the individual parameters of the various objects. It is understood by those skilled in the art that the collision determination can be made by determining, in various ways, whether or not the leading object 52 and an enemy object 54*a* or the attacking object 54*b* have collided by using the dynamic parameters of the leading object 52 and the enemy object 54*a* or the attacking object 54*b*.

Next, the information processing device 10 updates the game screen by drawing the game screen on the basis of the updated game state (S210). For example, the information processing device 10 displays the updated game screen on the display device 12 by determining the positions and states of various objects from the updated dynamic and individual parameters of the various objects and drawing the game screen. For example, when the HPs as an individual parameter of the updated enemy object 54*a* are zero, the enemy object 54*a* disappears from the game field 50 included in the updated game screen.

In S210, this process returns to S206 unless the game is terminated. This process can be executed concurrently with and in synchronization with other processes, such as the collision determination process and the skill process, as needed.

The process in each step in this flowchart is merely an example, and if a similar result can be obtained, the order of processes in the steps may be changed, or another process may be executed in addition to or instead of the process in each step. For example, the order of the processes in S202 to S210 can be changed.

Operation and Effect (1) The information processing device 10 according to this embodiment is an information processing device for executing a game and includes: a setting unit 231 for setting two or more game media on a deck with which indicator information is associated; an indicator-information-point calculation unit 232 for determining points for each item of the indicator information on the basis of predetermined data associated with the game media; and an indicator-information determination unit 233 for determining the indicator information to be displayed on a game screen on the basis of the points for each item of the indicator information obtained by the indicator-information-point calculation unit 232 and associating the determined indicator information with the deck.

This allows indicator information to be automatically imparted to the deck, thereby facilitating the grasping of the properties possessed by the organized party. This makes it more convenient for the player to use the indicator information as a reference when organizing a party or using the party in the game.

(2) The indicator-information determination unit 233 determines a predetermined number of items of indicator information with the highest points as the indicator information to be displayed on the game screen. This facilitates the grasping of the overall or dominant properties of the organized deck (team) without being caught up in detailed properties of the deck.

(3) The indicator-information determination unit 233 determines positions of the indicator information on the game screen on the basis of the points. This allows the player to grasp, by means of the positions displayed on the game screen, the importance of the properties indicated by the indicator information displayed on the game screen, thereby enhancing the convenience to the player.

(4) The indicator-information determination unit 233 determines only the indicator information the points of which are equal to or larger than a predetermined value as the indicator information to be displayed on the game screen. This allows the player to grasp that the properties possessed by the deck (team) are at a certain level and to use the properties as a reference to see, for example, if the set team organization will successfully work in games with a high degree of difficulty, thereby increasing the convenience to the player.

(5) The indicator-information-point calculation unit 232 has an indicator-information-type determination unit 232*a* for determining the type of the indicator information associated with the predetermined data on the basis of an indicator-information-type determination table Ta in which the predetermined data and the type of the indicator information are associated and the predetermined data and a point determination unit 232*b* for determining the points on the basis of a point determination table Tb in which a category related to the predetermined data and the points are associated and the category related to the predetermined data, and determines the points for each item of the indicator information on the basis of the points determined by the point determination unit 232*b* in the type of the indicator information determined by the indicator-information-type determination unit 232*a*.

This makes it possible to separate the determination of the type of indicator information from the determination of points in the indicator information, thereby facilitating the game administrator's management of automatic assignment of indicator information. For example, when the game administrator changes the association between predetermined data and the type of indicator information, he/she only needs to change the indicator-information-type determination table Ta and does not need to change the point determination table Tb. Also, when the game administrator is to change the distribution of points between categories related to predetermined data and points, the game administrator only needs to change the point determination table Tb and does not need to change the indicator-information-type determination table Ta.

(6) The predetermined data associated with the game media is data related to invoking conditions or effects of abilities associated with the game media, data related to invoking conditions or effects of skills associated with the game media, data related to invoking conditions or effects of abilities of equipped items associated with the game media, or a combination of one or more items of said data. This makes it possible to obtain indicator information indicating properties that affect the progress of the game.

(7) When a first level, which is the level of a game medium or the level of the player set by the setting unit 231, changes (e.g., increases), the indicator-information-point calculation unit 232 may enable predetermined data (e.g., invoking condition of an ability, etc.) associated with the game medium and determine points for each item of indicator information on the basis of the enabled predetermined data. This allows automatic determination of indicator information that is associated with the deck even when the change in the first level varies, saving the player the trouble of attaching the indicator information. Also, because the indicator information displayed on the game screen can change according to the first level, the player can be made aware that even a party that has been organized has new properties.

Embodiment Realized by the System

Figure 10:
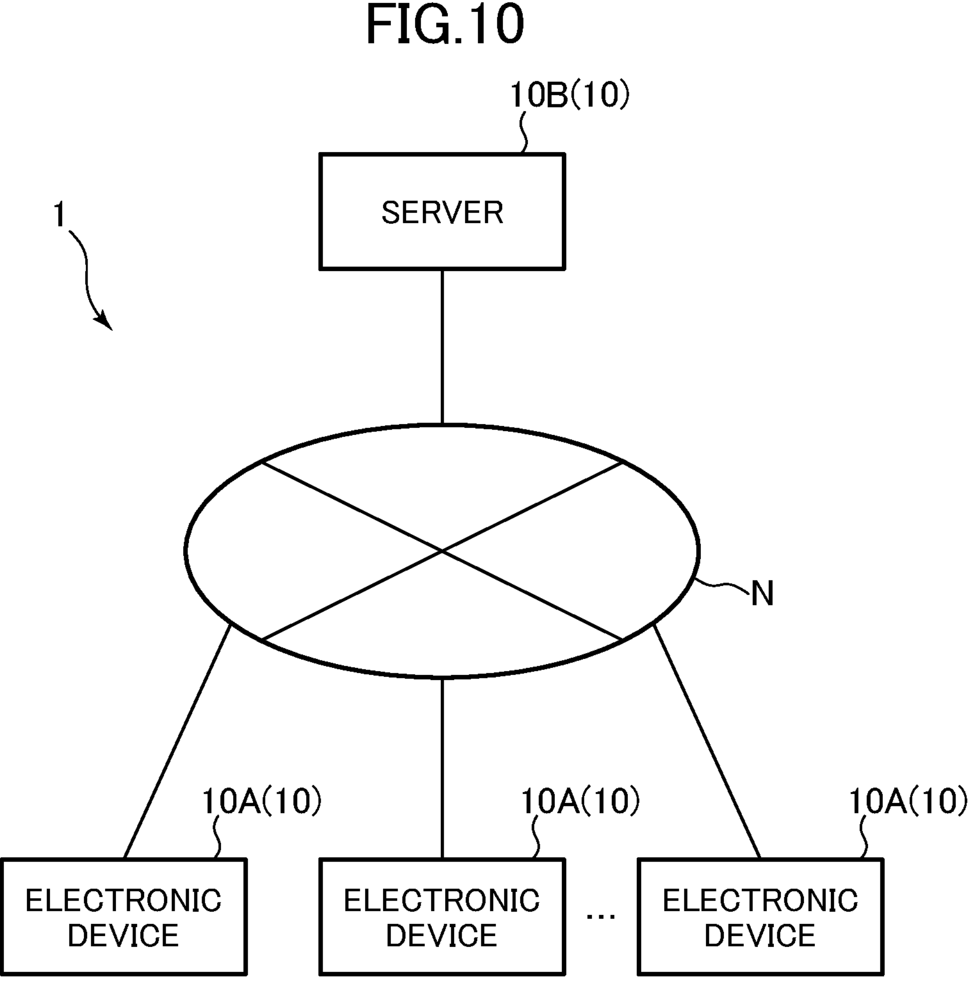
FIG. 10 shows an example of the overall configuration of a game system according to an embodiment of the present invention.

FIG. 10 shows an example of the overall configuration of the game system according to an embodiment of the present invention. As shown in FIG. 10, a game system 1 includes a plurality of information processing devices 10. At least one of the plurality of information processing devices 10 is a server 10B, and the other information processing devices 10 are electronic devices 10A, which are user terminals used by the respective players. The electronic devices 10A and the server 10B are connected to a network N, such as the Internet, so as to be capable of communicating with each other. Note that the game system 1 in this embodiment is described assuming a server-client system but can also be configured as a system not including the server 10B, such as P-to-P system.

Each of the electronic devices 10A and the server 10B includes a hardware configuration similar to the one shown in FIG. 1, and the electronic device 10A is assumed to be a smartphone in this embodiment. The server 10B is a server device that provides a game executable on the electronic devices 10A and comprises one or more computers.

The server 10B stores various programs, such as control programs for controlling the progress of online games, and various data used in the games.

In an example, the server 10B is configured to be capable of providing the electronic devices 10A with a game application executable on the electronic devices 10A. When an electronic device 10A executes a downloaded game application, the electronic device 10A proceeds with the game by transmitting/receiving data to/from the server 10B periodically or as needed. For example, the server 10B stores various types of setting information and history information necessary for the game executed on the electronic device 10A. In this case, the electronic device 10A has the functions of the input unit 21, the display unit 22, the game control unit 23, and the functional units in the game control unit 23.

In an example, the server 10B is a web server and provides game services to the electronic devices 10A. Each of the electronic devices 10A acquires, from the server 10B, HTML data for displaying a web page and analyzes the acquired HTML data to display the web page. In this case, the server 10B communicating with the electronic device 10A has some of the functions of the game control unit 23. For example, the electronic device 10A accepts the player's selection of game media, such as a player character and an equipped item, via the input unit 21 (input device 13) and sets mapping of these game media by means of the setting unit 231 of the server 10B. The electronic device 10A accepts a player input for invoking a skill via the input unit 21 (input device 13), and executes the skill process by means of the game control unit 23 of the server 10B to display skill presentations on the display unit 22 (display device 12) of the electronic device 10A.

In an example, the game system 1 provides a game that can be played by multiple users in one game field 50. For example, a collision object 54 can be an object operated by another user. Also, the party object 51 can be configured from player objects corresponding to multiple users.

Other Embodiments

Another embodiment of the present invention can be: a program for realizing the functions or the information processing shown in the flowchart of the aforementioned embodiment according to the present invention; or a computer-readable storage medium containing the program. Still another embodiment can be a method for realizing the functions or the information processing shown in the flowchart of the aforementioned embodiment according to the present invention. Still another embodiment can be a server that is capable of providing a computer with a program for realizing the functions or the information processing shown in the flowchart of the aforementioned embodiment according to the present invention. Furthermore, another embodiment of the present invention may be a virtual machine for realizing the functions or the information processing shown in the flowchart in the aforementioned embodiment of the present invention.

The processing or operation described above may be modified freely as long as no inconsistency arises in the processing or operation, such as an inconsistency that a certain step utilizes data that may not yet be available in that step. Furthermore, the examples described above are examples for explaining the present invention, and the present invention is not limited to those examples. The present invention can be embodied in various forms as long as there is no departure from the gist thereof.

For example, in the aforementioned embodiment, the game is a pinball game, but is not limited to this. The game can be a game in which a party is organized and progress is made using the organized party, and such a game is included in the scope of the present invention. For example, the scope of the invention includes card games in which game media representing a plurality (e.g., dozens) of cards are organized into a deck and played.

In the aforementioned embodiment, the points for each item of indicator information are calculated using the indicator-information-type determination table Ta and the point determination table Tb. In contrast, predetermined data associated with a game medium may be indicator-information-determining data in which the game medium and the points for each item of indicator information are associated, so that the indicator-information-point calculation unit 232 may calculate the points for each item of indicator information on the basis of the indicator-information-determining data. In this way, indicator information can still be automatically imparted to the deck, thereby enhancing convenience to the player.

The information processing device 10 may have an indicator-information-determining-data determination unit that, on the basis of a player input, sets indicator-information-determining data in which a game medium and points for each item of indicator information are associated or changes the points of the indicator-information-determining data. In this case, predetermined data associated with the game media may be the indicator-information-determining data. In this way, indicator information can still be automatically imparted to the deck, thereby enhancing convenience to the player. In particular, since indicator-information-determining data is determined by a player input, indicator information in accordance with the player's senses can be automatically imparted to the deck.

REFERENCE SIGNS LIST

1 Game system
10 Information processing device
10A Electronic device
10B Server
11 Processor
12 Display device
13 Input device
13*a* Touchscreen
14 Storage device
15 Communication device
16 Bus
21 Input unit
22 Display unit
23 Game control unit
231 Setting unit
232 Indicator-information-point calculation unit

232*a* Indicator-information-type determination unit
232*b* Point determination unit
233 Indicator-information determination unit
50 Game field
51 Party object
52 Leading object
53 Following object
54 Collision object
54*a* Enemy object
54*b* Attacking object
54*c* Wall
55 Operation object
55*a* One end portion
55*b* Other end portion
N Network
G1 Party organization screen
G2 SET edit screen
Ta Indicator-information-type determination table
Tb Point determination table

The invention claimed is:

1. A non-transitory computer readable medium storing a program for a game executed by an information processing device comprising a hardware processor, said program causing the information processing device to perform a method comprising setting two or more game media on a deck;

determining points for each item of indicator information based on predetermined data associated with the two or more game media;

determining the indicator information to be displayed on a game screen based on the points for each item of the indicator information; and associating the determined indicator information with the deck.

2. The non-transitory computer readable medium according to claim 1, wherein the method further comprises determining a predetermined number of items of indicator information with the highest points as the indicator information to be displayed on the game screen.

3. The non-transitory computer readable medium according to claim 1, wherein method further comprises determining a position of the indicator information on the game screen based on the points.

4. The non-transitory computer readable medium according to claim 1, wherein the method comprises determining only the indicator information the points of which are equal to or larger than a predetermined value as the indicator information to be displayed on the game screen.

5. The non-transitory computer readable medium according to claim 1, wherein the method further comprises:

determining a type of the indicator information associated with the predetermined data based on an indicator-information-type determination table in which the predetermined data and the type of the indicator information are associated and the predetermined data, determining the points based on a point determination table in which a category related to the predetermined data and the points are associated and the category related to the predetermined data, and determining the points for each item of the indicator information based on the points in the type of the indicator information.

6. The non-transitory computer readable medium according to claim 1, wherein the predetermined data associated with the two or more game media is selected from a group consisting of:

data related to an invoking condition or an effect of an ability associated with the two or more game media, data related to an invoking condition or an effect of a skill associated with the two or more game media, data related to an invoking condition or an effect of an ability of an equipped item associated with the two or more game media, or a combination of two or more items of said data.

7. The non-transitory computer readable medium according to claim 1, wherein the predetermined data associated with the two or more game media is indicator-information-determining data in which the two or more game media and the points for each item of the indicator information are associated, and wherein the method further comprises calculating the points for each item of the indicator information based on the indicator-information-determining data.

8. The non-transitory computer readable medium according to claim 1, wherein the method further comprises setting indicator-information-determining data in which the two or more game media and the points for each item of the indicator information are associated or changing the points of the indicator-information-determining data based on a player input, and wherein the predetermined data associated with the two or more game media is the indicator- information-determining data.

9. An information processing device comprising:

a hardware processor; and a memory connected to the processor, wherein the memory comprises a program configured to perform a method comprising:

setting two or more game media on a deck;

determining points for each item of indicator information based on predetermined data associated with the two or more game media;

determining the indicator information to be displayed on a game screen based on the points for each item of the indicator information; and associating the determined indicator information with the deck.

10. A method comprising:

setting, by an electronic device comprising a hardware processor and a memory, two or more game media on a deck;

determining, by the electronic device, points for each item of indicator information based on predetermined data associated with the two or more game media;

determining, by the electronic device, the indicator information to be displayed on a game screen based on the points for each item of the indicator information; and associating, by the electronic device, the determined indicator information with the deck.

11. A system for a game, comprising:

an electronic device; and a server connected to the electronic device via a network, wherein the electronic device or the server is configured to perform a method comprising:

setting two or more game media on a deck, determining points for each item of indicator information based on predetermined data associated with the two or more game media, determining the indicator information to be displayed on a game screen based on the points for each item of the indicator information, and associating the determined indicator information with the deck.

* * * * *